UNITED STATES PATENT OFFICE.

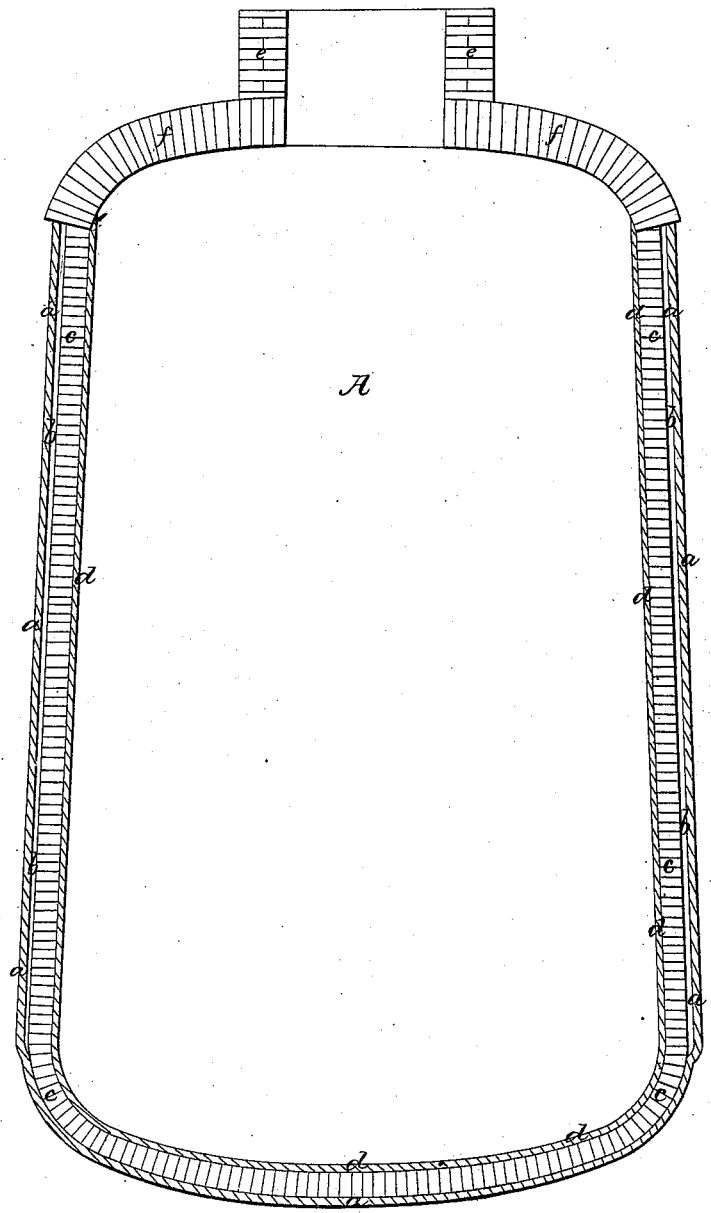

JACOB PEEBLES, OF VIDALIA, LOUISIANA.

BRICK CISTERN.

Specification of Letters Patent No. 4,647, dated July 20, 1846.

*To all whom it may concern:*

Be it known that I, JACOB PEEBLES, of Vidalia, in the State of Louisiana, have made a new and useful Improvement in the Manner of Constructing Cisterns for the Holding of Water in Alluvial Soils; and I do hereby declare that the following is a full and exact description thereof.

My cistern is an improvement upon that for which Letters Patent of the United States were granted to George W. Blenis on the 18th of August 1837. In the cistern patented by him, the side walls were made cylindrical as usual, and the improvement consisted in his making the bottoms thereof in the form of an inverted arch, or rather of an inverted dome, and this was done to enable it to resist the hydrostatic pressure which, in alluvial, or moist soils, is sufficient to raise and burst up the bottoms of cisterns, when such bottoms are flat, and the cistern is not filled with water. In the low lands of the Mississippi, and in other situations of a like character, where the rise of the adjacent waters is considerable, the cisterns made upon the plan of said Blenis have failed, the pressure being sufficient to raise the whole body of the cistern, with its domed bottom, from the ground upon which it was made to rest. To obviate this difficulty, I make my cisterns in the form of a frustum of a cone, the base, or larger diameter of the cone being downward. The bottom I form in the manner of those constructed by Blenis, and I usually inclose it at top, by building thereon a dome of masonry, but it may be covered in this part with plank, or with flat stones.

Although I do not intend to claim the particular manner that I usually adopt, and prefer, in the building of my cisterns, I will describe it, as I have found it superior to any other.

The accompanying drawing represents a vertical section through the axis of one of my cisterns, with its sides conical, its bottom in the form of an inverted, and its top in that of a direct dome.

After digging out my cistern so as to give the desired dimensions and form to its bottom and sides, I plaster the whole of the earth constituting said bottom and sides, with hydraulic mortar to the thickness of about an inch, as shown at $a, a, a;$ I then lay bricks $c, c,$ on the bottom in the proper cement, and upon this I build my side walls, leaving the distance of about half an inch between the brick work $c, c,$ and the plastering $a, a,$ as shown at $b, b$ and as the work goes in, I pour grouting into this space so as to fill it completely. The inside of the brick work, I then plaster with cement, as shown at $d, d.$

Having thus fully described the nature and object of my improvement in the manner of constructing cisterns in alluvial, or wet soils, what I claim therein as new and desire to secure by Letters Patent, is—

1. The combining of the conical form of the sides thereof, with the inverted dome bottom, in the manner and for the purpose herein fully made known.

2. I do not claim either the conical sides, or the inverted dome-bottom, alone, their combined action being necessary to the attainment of the end desired; and it will be manifest, that in making this claim, it is not a claim to a mere change of form, but to one that is necessary to the attainment of an important and very useful result.

JACOB PEEBLES.

Witnesses:
 JAS. EDWARD,
 H. B. SHAW.